Figure 1:
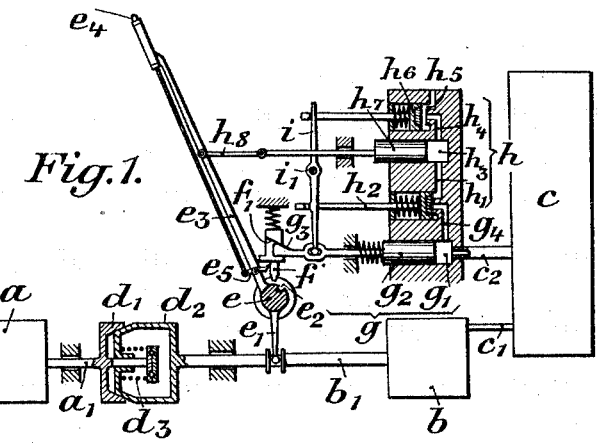

Oct. 22, 1929.   F. FAUDI   1,732,717
COMPRESSED AIR CONTROLLING MECHANISM

Filed March 15, 1928

INVENTOR:
Fritz Faudi
BY
Lorka, Kellenbeck & Farley
ATTORNEYS

Patented Oct. 22, 1929

1,732,717

UNITED STATES PATENT OFFICE

FRITZ FAUDI, OF SOMMERDA, GERMANY, ASSIGNOR OF ONE-HALF TO RHEINISCHE METALLWAAREN- UND MASCHINENFABRIK SOMMERDA AKTIENGESELLSCHAFT, OF SOMMERDA THURINGIA, GERMANY

COMPRESSED-AIR-CONTROLLING MECHANISM

Application filed March 15, 1928, Serial No. 261,755, and in Germany May 31, 1927.

The invention relates to means for controlling the production of compressed air which is used in automobiles to feed the air brake and the shock absorbers. In motor vehicles equipped with air brakes and air shock absorbers the compressed air required by these devices is produced and replenished by means of a compressor which when necessary is coupled to the motor of the vehicle to be driven thereby. The coupling and uncoupling of the motor and compressor are usually effected automatically by means of a separate controlling mechanism operating in response to the pressure existing in the air tank. The controlling mechanisms hitherto proposed usually included a piston movable in response to the pressure in the air tank 8 to a spring and operating upon fall of the air pressure in the tank below a predetermined minimum to couple the compressor with the motor and also effecting release of such coupling when the normal operating pressure is reached in the tank.

The present invention has for its object to provide a controlling mechanism adapted to effect coupling and uncoupling of the compressor with the motor, both automatically and suddenly in a safe and reliable manner and at the same time to provide a mechanism of this kind having the largest possible interval between the controlling pressures (i. e. between the maximum and minimum pressures) whereby the necessity of rather frequent coupling and uncoupling of the compressor is avoided, so that the wear on the mechanism is reduced to a minimum.

In accordance with my invention the controlling mechanism includes a piston movable under the action of both the pressure prevailing in the air tank and a spring, the piston, upon fall of the pressure to a predetermined minimum, operating to release a locking mechanism which holds the compressor motor coupling in inoperative position and permitting the coupling to be thrown in under the action of a spring associated therewith. The controlling mechanism includes also a second piston operatively connected to the coupling, which piston, upon rise of the pressure in the air tank to a predetermined maximum, is subjected to such pressure through suitable automatic valve mechanism and thereupon operates to disengage the coupling and thus disconnect the compressor from the motor.

Figure 2:
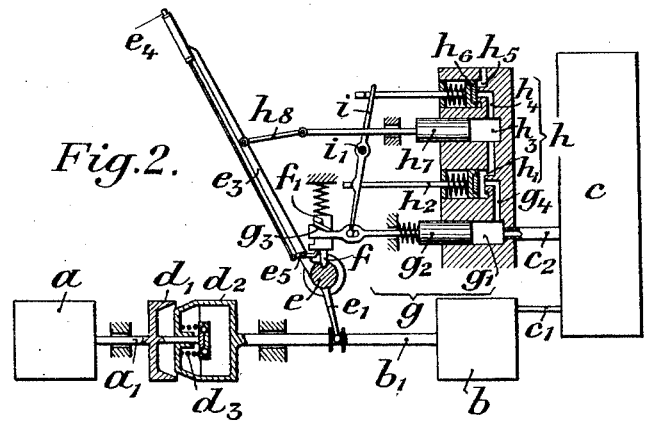

In order to allow of my invention to be more easily understood, a preferred embodiment of same is diagrammatically illustrated by way of example in the drawing which accompanies and forms part of this specification. In this drawing:

Figure 1 shows the automatically operating controlling device with the motor-compressor coupling in engaged position, whilst Figure 2 shows the device with this coupling in disengaged position.

$a$ denotes the motor of the car and $b$ the compressor serving to generate the compressed air stored up in the tank $c$. The compressor is connected with the tank $c$ by pipe $c_1$. The motor $a$ and the compressor $b$ are coupled with one another e. g. by a friction clutch adapted to be thrown in and out during the run of the motor $a$. The driving motor shaft $a_1$ has mounted on it the one half $d_1$ of the clutch, the other half $d_2$ of which is fixed on shaft $b_1$ that leads to the compressor $b$ and may be shifted longitudinally. A spring $d_3$ interposed between the two halves $d_1$, $d_2$ of the clutch tends to establish their operative position. A throw-out lever $e_1$ engaged between two collars of shaft $b_1$, as shown, is fixed on a shaft $e$ which has a rest $e_2$. If the clutch $d_1$, $d_2$ is disengaged, a spring-loaded locking member $f$ enters the rest $e_2$ of shaft $e$ and secures the clutch in disengaged position.

The automatic throw-in device $g$ comprises a compressed air cylinder $g_1$ which is in connection with the compressed air tank $c$ by a pipe $c_2$. A spring-loaded piston $g_2$ is lodged in cylinder $g_1$ and has a rear stem carrying an inclined cam face $g_3$ adapted to so co-operate with a counter face $f_1$ provided on the locking member $f$, that with a determined position of the piston $g_2$ the locking member $f$ is lifted out of the rest $e_2$ of shaft $e$, and the two halves $d_1$, $d_2$ of the clutch are thrown into gear by spring $d_3$.

A passage $g_4$ leads from the compressed air cylinder $g_1$ of the throw-in device to the automatically operating throw-out device $h$. This device comprises a compressed air cylinder $h_3$ that communicates with passage $g_4$ through an air inlet valve $h_1$ the valve piston $h_2$ of which is under the action of a spring, as shown. A passage $h_4$ leads into the atmosphere from cylinder $h_3$ through an air outlet valve $h_5$ that possesses likewise a spring-actuated valve piston $h_6$. A piston $h_7$ is lodged in the compressed air cylinder $h_3$, the stem of which piston is hingedly connected to a hand-lever $e_3$ rigid on lever shaft $e$ through the intermediary of a link $h_8$.

A double-armed lever $i$ mounted for rocking motion on a fixed journal $i_1$ establishes the connection between the throw-in device $g$ and the throw-out device $h$. To this end the lever $i$ is pivotally connected to the stem of piston $g_2$ of the throw-in device $g$ and positively acts upon the stems of the air inlet valve piston $h_1$ and the air outlet piston valve $h_5$, if the piston $g_2$ assumes its end positions, in such a manner, that alternately one of these two valves $h_1$, $h_5$ is opened.

The hand lever $e_3$ is provided with a throw-out mechanism $e_4$ $e_5$ of any known design that serves to lift the locking member $f$ out of the rest $e_2$ of the shaft $e$, in order to throw the clutch $d_1$ $d_2$ into or out of gear independently of the automatically operating controlling device $g h$ by human agency, that is by hand or foot manipulation.

In describing the mode of operation of the described controlling arrangement it may be assumed that the compressed air tank $c$ is exhausted and should be re-loaded up to normal service pressure of e. g. 30 atmospheres by means of the compressor $b$. In this stage the piston $g_2$, Figure 1, of the throw-in device $g$ has assumed its right-hand end position in the cylinder $g_1$ under the action of its spring, and it has lifted by its cam face $q_3$ the locking member $f$ out of the rest $e_2$ of shaft $e$, so that the clutch $d_1$ $d_2$ has been thrown into gear suddenly, but not gradually, under the action of spring $d_3$, the shaft $e$ executing at the same time a rocking motion in clockwise direction. The double lever $i$ is in a position such as to abut with its free arm on a nose of the stem of outlet valve $h_5$ $h_6$, and has opened this valve. Now upon the motor $a$ of the car being started, it drives the compressor $b$ which loads up the compressed air tank $c$. With the pressure increasing in tank $c$, the pressure prevailing in the cylinder $g_1$ of the throw-in device $g$ increases too, so that the piston $g_2$ is gradually shifted outward against the action of its spring into its left-hand end position. When this takes place, the outlet valve $h_5$ is closed under its spring action, and the cam face $g_3$ of the piston member $g_2$ releases the locking member $f$, so that this latter is again ready to engage the rest $e_2$ of the shaft $e$.

When the pressure in tank $c$ has reached up to service pressure of 30 atmospheres the piston $g_2$ has has been shifted so far against the action of its spring, that the lever $i$ takes with it the piston $h_2$ of inlet valve $h_1$ of the throwout device $h$ and opens valve $h_1$. Compressed air thus enters the cylinder $h_3$ and pushes the piston $h_7$ outward, which through the intermediary of the levers $e_3$, $e_1$ suddenly throws at once the motor-compressor clutch $d_1$ $d_2$ out of gear and thus disconnects the compressor $b$ from motor $a$. The locking member $f$ engages the rest $e_2$ of shaft $e$ and secures the clutch half $d_2$ in thrown-out position, see Figure 2.

Now the inlet valve $h_1$ of the throw-out device $h$ at first persists in open position and the outlet valve $h_5$ under spring action in closed position, until with the subsequent decrease of the pressure in tank $c$ due to consumption of compressed air by braking or by re-filling the shock absorber cylinders the piston $g_2$ of the throw-in device $g$ is gradually shifted back into the cylinder $g_1$ by its spring. When this takes place, the piston $h_2$ of air inlet valve $h_1$ is released by lever $i$ and this valve is closed by its spring. Before reaching its right-hand end position in cylinder $g_1$, which is the case with a pressure of about 10 atmospheres in tank $c$, the piston $g_2$ opens the outlet valve $h_5$ $h_6$ by means of lever $i$, so that the air enclosed in chamber $h_3$ escapes. The valve $h_5$ remains open until the clutch $d_1$, $d_2$ automatically has been thrown in again upon the pressure in tank $c$ decreasing below the lowermost admissible amount, viz 10 atmospheres so that the piston $h_7$ could be shifted again into the cylinder $h_3$ without any compression taking place therein.

What I claim is:

1. In a motor vehicle, in combination, a motor, a compressor adapted to be driven thereby, an air tank, a disengageable clutch interposed between said motor and compressor, a spring adapted to throw said clutch into gear, a lock adapted to prevent said spring from throwing in said clutch, a piston adapted to be shifted under the action of the air pressure generated by said compressor, a spring operative to shift said piston in an opposite direction upon decrease of the air pressure below a predetermined amount, means for operatively connecting said piston with said lock and movable to set the latter into locking and unlocking position, respectively, upon said piston being shifted by the air under pressure and reshifted by its spring, a second piston adapted to be shifted by the air under pressure upon the latter exceeding a predetermined amount, and means for connecting said last-named piston with said clutch and for throwing the latter out upon said last-named piston being so shifted.

2. In a motor vehicle, in combination, a motor, a compressor adapted to be driven thereby, an air tank, a disengageable clutch interposed between said motor and compressor, a spring adapted to throw said clutch into gear, a lock adapted to prevent said spring from throwing in said clutch, a piston adapted to be shifted under the action of the air pressure generated by said compressor, a spring operative to shift said piston in an opposite direction upon decrease of the air pressure below a predetermined amount, means for operatively connecting said piston with said lock and movable to set the latter into locking and unlocking position, respectively, upon said piston being shifted by the air under pressure and reshifted by its spring, a second piston adapted to be shifted by the air under pressure upon the latter exceeding a predetermined amount, means for connecting said last named piston with said clutch and for throwing the latter out upon said last named piston being so shifted, an outlet valve for the air actuating said last named piston, and means operative upon the throwing in of the clutch for opening said outlet valve.

3. In a motor vehicle, in combination, a motor, a compressor adapted to be driven thereby, an air tank, a disengageable clutch interposed between said motor and compressor, a spring adapted to throw said clutch into gear, a lock adapted to prevent said spring from throwing in said clutch, a piston adapted to be shifted under the action of the air under pressure generated by said compressor, a spring operative to shift said piston in an opposite direction upon decrease of the air pressure below a predetermined amount, means for operatively connecting said piston with said lock and movable to set the latter into locking and unlocking position, respectively, upon said piston being shifted by the air under pressure and reshifted by its spring, a second piston adapted to be shifted by the air under pressure upon the latter exceeding a predetermined amount, means for connecting said last named piston with said clutch and for throwing the latter out upon said last named piston being so shifted, an outlet valve for the air actuating said last named piston, and means operable to open said valve upon movement of said first named piston to throw in said clutch.

4. In a motor vehicle, in combination, a motor, a compressor adapted to be driven thereby, an air tank, a disengageable clutch interposed between said motor and compressor, a spring adapted to throw said clutch into gear, a lock adapted to prevent said spring from throwing in said clutch, a piston adapted to be shifted under the action of the air under pressure generated by said compressor, a spring operative to shift said piston in an opposite direction upon decrease of the air pressure below a predetermined amount, means for operatively connecting said piston with said lock and movable to set the latter into locking and unlocking position, respectively, upon said piston being shifted by the air under pressure and reshifted by its spring, a second piston adapted to be shifted by the air under pressure, a valve adapted to supply compressed air to said last named piston to shift the same upon the air pressure reaching the highest permissible amount, means for connecting said last named piston with said clutch and for throwing the latter out when such piston is so shifted, and means operable upon movement of said first named piston for opening said valve upon the air pressure reaching its highest permissible amount.

5. In a motor vehicle, in combination, a motor, a compressor adapted to be driven thereby, an air tank, a disengageable clutch interposed between said motor and compressor, a spring adapted to prevent said clutch into gear, a lock adapted to prevent said spring from throwing in said clutch, a piston adapted to be shifted under the action of the air under pressure generated by said compressor, a spring operative to shift said piston in an opposite direction upon decrease of the air pressure below a predetermined amount, means for operatively connecting said piston with said lock and movable to set the latter into locking and unlocking position, respectively, upon said piston being shifted by the air under pressure and reshifted by its spring, a second piston adapted to be shifted by the air under pressure upon the latter exceeding a predetermined amount, means for connecting said last named piston with said clutch and for throwing the latter out when such piston is so shifted, and a manually operable lever for throwing said clutch in and out independently of said pistons.

6. In a motor vehicle, in combination, a motor, a compressor adapted to be driven thereby, an air tank, a disengageable clutch interposed between said motor and compressor, a spring adapted to throw said clutch into gear, a lock adapted to prevent said spring from throwing in said clutch, a piston adapted to be shifted under the action of the air under pressure generated by said compressor, a spring operative to shift said piston in an opposite direction upon the decrease of the air pressure below a predetermined amount, means for operatively connecting said piston with said lock and movable to set the latter into locking and unlocking position upon said piston being shifted by the air under pressure and reshifted by its spring, a second piston adapted to be shifted by the air under pressure, a valve adapted to supply compressed air to said last named piston to shift the same upon the air pressure reaching the highest permissible amount, means for connecting said last named piston with said clutch and for throwing the latter out when such piston is so shifted, an outlet valve for the air actuating said last named piston, means operable upon movement of said first named piston for opening said outlet valve upon throwing in of said clutch, and a manually operable lever for throwing said clutch in and out independently of said pistons.

In testimony whereof I have affixed my signature.

FRITZ FAUDI.